US006625350B2

(12) United States Patent
Kikuchi et al.

(10) Patent No.: US 6,625,350 B2
(45) Date of Patent: Sep. 23, 2003

(54) FIBER COLLIMATOR ARRAY

(75) Inventors: Juro Kikuchi, Kakegawa (JP);
Yasuyuki Mizushima, Kakegawa (JP);
Hiroki Takahashi, Fukuroi (JP);
Yoshiaki Takeuchi, Shizuoka (JP)

(73) Assignee: Osaki Electric Co., Ltd., Tokyo (JP)

( * ) Notice: Subject to any disclaimer, the term of this patent is extended or adjusted under 35 U.S.C. 154(b) by 40 days.

(21) Appl. No.: 09/767,255

(22) Filed: Jan. 22, 2001

(65) Prior Publication Data

US 2002/0097956 A1 Jul. 25, 2002

(51) Int. Cl.[7] .................................... G02B 6/32

(52) U.S. Cl. .......................... 385/33; 385/31; 385/34; 385/35

(58) Field of Search ............... 385/31, 33–35, 385/39, 51, 78, 80, 85, 89, 93

(56) References Cited

U.S. PATENT DOCUMENTS

| | | | | |
|---|---|---|---|---|
| 4,815,807 A | | 3/1989 | Kaneko et al. | 385/33 |
| 4,995,709 A | | 2/1991 | Iwata et al. | 359/641 |
| 5,394,493 A | | 2/1995 | Ames | 385/35 |
| 5,400,429 A | | 3/1995 | Ames et al. | 385/147 |
| 5,446,815 A | * | 8/1995 | Ota et al. | 385/33 |
| 5,815,624 A | * | 9/1998 | Rosenberg | 385/115 |
| 6,010,251 A | * | 1/2000 | Koyanagi et al. | 385/93 |
| 6,012,852 A | * | 1/2000 | Kadar-Kallen et al. | 385/74 |
| 6,019,522 A | | 2/2000 | Kim | 385/80 |
| 6,142,678 A | * | 11/2000 | Cheng | 385/79 |
| 6,168,319 B1 | * | 1/2001 | Francis | 385/79 |
| 6,263,133 B1 | * | 7/2001 | Hamm | 385/33 |
| 6,304,694 B1 | * | 10/2001 | Ford | 385/33 |
| 6,328,482 B1 | * | 12/2001 | Jian | 385/88 |
| 6,393,179 B1 | * | 5/2002 | Cheng et al. | 385/34 |
| 6,404,955 B1 | * | 6/2002 | Kikuchi et al. | 385/35 |
| 2002/0057873 A1 | * | 5/2002 | Wu et al. | 385/33 |

OTHER PUBLICATIONS

ACT MicroDevices, Inc., "Fiber Optic SubComponents, Collimator Arrays," 2 pgs., Sep. 7, 2000, www.advanct.com/collarray.htm.
ACT MicroDevices, Inc., "Fiber Optic SubComponents, Microlens AR Coatings," 2 pgs., Sep. 7, 2000, www.advanct.com/microlens.htm.
ACT MicroDevices, Inc., "Fiber Optic SubComponents, Fiber AR, Reflective Coatings," 2 pgs., Sep. 7, 2000, www.advanct.com/arcoating.htm.
ACT MicroDevices, Inc., "Fiber Optic SubComponents, Angle Polished Fibers," 1 pg., Sep. 7, 2000, www.advanct.com/angpolish.htm.
ACT MicroDevices, Inc., "Fiber Optic SubComponents, Fiber Arrays," 3 pgs., Sep. 7, 2000, www.advanct.com/array.htm.
ACT MicroDevices, Inc., "Fiber Optic SubComponents, 2–D Fiber Arrays," 2 pgs., Sep. 7, 2000, www.advanct.com/2darray.htm.
ACT MicroDevices, Inc., "Fiber Optic SubComponents, Fiber Collimators," 2 pgs., Sep. 7, 2000, www.advanct.com/collimator.htm.
Rochester Photonics Corporation, "Collimating lenses & Arrays," 2 pgs., Oct. 25, 2000, www.rphotonic.com/collimator.htm.

(List continued on next page.)

Primary Examiner—Brian Healy
Assistant Examiner—Sarah U Song
(74) Attorney, Agent, or Firm—Collard & Roe, P.C.

(57) ABSTRACT

An optical fiber collimator array includes an optical fiber array block and a microlens array substrate. The optical fiber array block includes an angled surface and is configured to receive and retain a plurality of individual optical fibers, which carry optical signals. The microlens array substrate includes a plurality of microlenses integrated along a microlens surface and a sloped surface opposite the microlens surface. The microlens surface is coupled to the angled surface such that the optical signals from the individual optical fibers are each collimated by a different one of the integrated microlenses.

24 Claims, 5 Drawing Sheets

OTHER PUBLICATIONS

Rochester Photonics Corporation, "Microlens Array," 2 pgs., Oct. 25, 2000, www.rphotonics.com/array.htm.

Rochester Photonics Corporation, "About RPC," 2 pgs., Oct. 25, 2000, www.rphotonics.com/about.htm.

NSG America, Inc., "Planar Microlens Array (PML)," 2 pgs., Sep. 8, 2000, www.nsgamerica.com/pml.shtml.

NSG America, Inc., "Our Products," 3 pgs., Sep. 8, 2000., www.nsgamerica.com/products.shtml.

NSG America, Inc., "Physics of the SELFOC Lens," 2 pgs., Sep. 8, 2000, www.nsgamerica.com/physics.shtml.

NSG America, Inc. "Grin & SELFOC," 2 pgs., Sep. 8, 2000, www.nsgamerica.com/grin selfoc.shtml.

NSG, "Micro–optics," 2 pgs., Sep. 7, 2000, www.nsg.co.jp/english/moc.

NSG America, Inc., "SELFOC® Lens Array (SLA)," 5 pgs., Sep. 8, 2000, www.nsgamerica.com/sla.shtml.

ACT MicroDevices, Inc., "Data Sheet S4100XX Series, Fiber Array Assemblies," 1 pg., Feb. 25, 2000.

ACT MicroDevices, Inc., "Data Sheet S4101XX Series, Fiber Collimators," 1 pg., Feb. 14, 1999.

* cited by examiner

FIBER COLLIMATOR ARRAY

BACKGROUND OF THE INVENTION

1. Field of the Invention

The present invention is directed to a fiber collimator array and more specifically to a fiber collimator array for use in an optical transmission system and/or an optical sensor system.

2. Technical Background

Collimation is a process by which divergent beams of radiation or particles (e.g., light rays) are converted into parallel beams. Laser diode (LD) collimating lenses are commonly used in laser beam printers, bar code scanners and sensors. In addition, fiber collimators are widely used in a variety of optical applications (e.g., optical filters). Due to the recent increase in demand for fiber collimators, to be used with wave division multiplexed (WDM) systems, reducing the fiber collimator cost has become increasingly important.

However, commercially available fiber collimator arrays have typically implemented separate lenses, which has increased the cost of the array. For example, one commercially available collimator array has utilized a V-groove array substrate with individually aligned gradient-index (GRIN) microlenses and fibers in each V-groove. These GRIN microlenses have generally been produced by an ion-exchange process and normally provide high coupling efficiency and have been utilized as collimators for laser beam printers, bar code scanners, optical isolators, circulators and digital versatile disc (DVD) players, as well as miniature objective lenses for medical/industrial endoscopes.

Planar microlens arrays (PMLAs) are two-dimensional GRIN-type lens arrays that integrate ion-exchange technology and photolithography. By diffusing ions through a photolithographic mask into a glass substrate, numerous microscopic lenses can be formed in various sizes and patterns. Commercially available PMLAs are available with swelled lens surfaces, which tend to increase coupling efficiencies in transceiver applications, or with flat surfaces, which typically simplify collimation with fiber arrays. PMLAs have been used in liquid crystal projectors, three dimensional data processing and two dimensional laser diode (LD) coupling to fibers. Other manufactures, such as Rochester Photonics Corp., have produced aspheric collimating microlenses that are intended to replace GRIN-type microlenses in collimating applications.

However, the effectiveness of GRIN-type PMLAs and collimating arrays incorporating aspheric collimating microlenses are highly dependent on the configuration of the fiber collimator array. As such, it is important to configure the fiber collimator array to reduce insertion loss and internal reflections.

SUMMARY OF THE INVENTION

An embodiment of the present invention is directed to an optical fiber collimator array that includes an optical fiber array block and a microlens array substrate. The optical fiber array block includes an angled surface and is configured to receive and retain a plurality of individual optical fibers, which carry optical signals. The microlens array substrate includes a plurality of microlenses integrated along a microlens surface and a sloped surface opposite the microlens surface. The microlens surface is coupled to the angled surface such that the optical signals from the individual optical fibers are each collimated by a different one of the integrated microlenses.

According to another embodiment of the present invention, an optical fiber collimator array includes an optical fiber array block, a microlens array substrate and an index-matched spacer. The optical fiber array block is configured to receive and retain a plurality of individual optical fibers, which carry optical signals. The microlens array substrate includes a plurality of microlenses integrated along a microlens surface and the index-matched spacer couples the optical fiber array block to the microlens array substrate.

Additional features and advantages of the invention will be set forth in the detailed description which follows and will be apparent to those skilled in the art from the description or recognized by practicing the invention as described in the description which follows together with the claims and appended drawings.

It is to be understood that the foregoing description is exemplary of the invention only and is intended to provide an overview for the understanding of the nature and character of the invention as it is defined by the claims. The accompanying drawings are included to provide a further understanding of the invention and are incorporated and constitute part of this specification. The drawings illustrate various features and embodiments of the invention which, together with their description, serve to explain the principals and operation of the invention.

DETAILED DESCRIPTION OF THE PREFERRED EMBODIMENT(S)

The present invention is directed to an optical fiber collimator array that includes a microlens array substrate and an optical fiber array block that are configured to reduce insertion loss and to reduce internal reflections. Each microlens is preferably a graded-index (GRIN) lens, an aspheric lens or a Fresnel lens. A GRIN lens has a refractive index that decreases with distance from its optical axis (i.e., center). This causes light rays to travel in sinusoidal paths, with the length of one complete cycle being known as the pitch of the lens. Commercially available fiber array blocks typically have a pitch of either two-hundred fifty microns or one-hundred twenty-seven microns. The pitch of the fiber block limits the microlens diameter, which may limit the coupling efficiency of the lens since the modefield diameter of the optical power (of the optical signal) in the microlens plane is limited by the microlens diameter.

To reduce coupling loss to less than 0.01 dB, the modefield diameter should typically be less than half the effective microlens diameter. As such, when a GRIN lens with a pitch of two-hundred fifty microns is used, the modefield diameter should be less than one-hundred ten microns since the effective lens diameter is typically less than ninety percent of the physical lens diameter. While a larger collimated beam diameter is preferable in order to get higher coupling efficiency, at typical working distances over a few millimeters, in practical use, the modefield diameter limits the diameter of the collimated optical beam. As such, the dimensions of the fiber collimator array, including the optical fiber array block and the microlens array substrate, are limited. Preferably, the modefield diameter of an optical signal on a microlens plane should be set close to one-hundred ten microns.

Figure 1A:
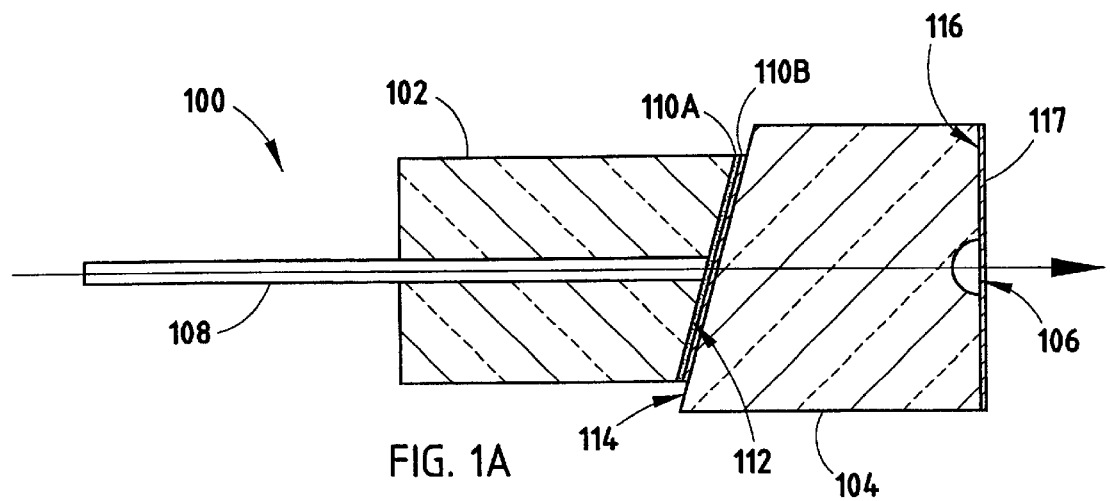
FIG. 1A is a cross-sectional view of an optical fiber collimator array, according to an embodiment of the present invention.
Figure 1B:
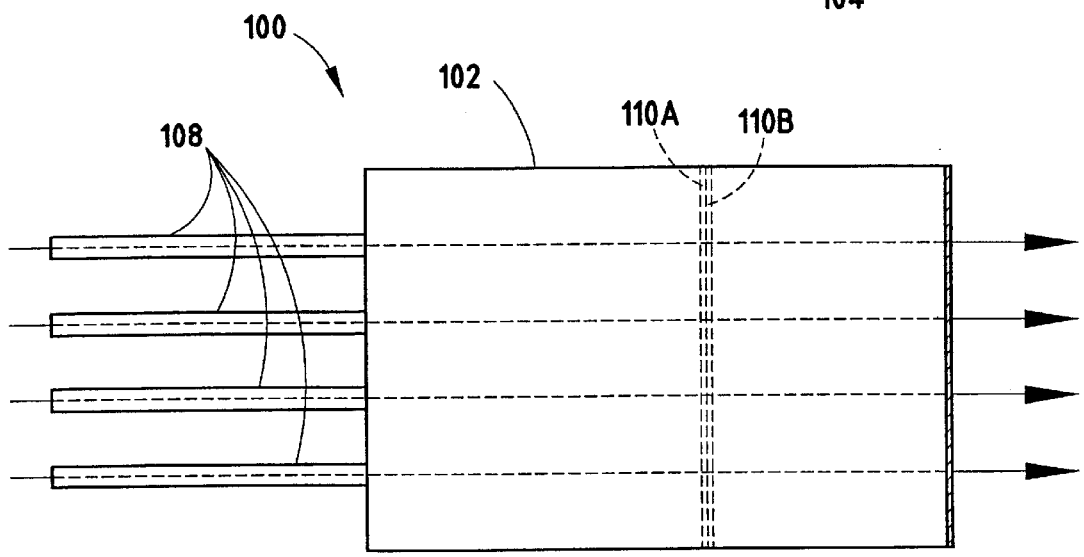
FIG. 1B is a top plan view of the array of FIG. 1A.

Turning to FIGS. 1A–1B, a cross-sectional and top plan view, respectively, of an optical fiber collimator array 100, according to an embodiment of the present invention, are depicted. The array 100 retains a plurality of optical fibers 108 within an optical fiber array block 102, which includes a plurality of channels for receiving the fibers 108, which are preferably retained within the block 102 with an adhesive. A planar graded-index (GRIN) microlens array substrate 104 includes a plurality of GRIN microlenses 106, which are spaced such that each microlens 106 receives an optical signal from one of the optical fibers 108. The fiber array block 102 includes an angled surface 112, opposite the end of the fiber block 102 in which the fibers 108 enter the fiber block 102. The microlens array substrate 104 includes a sloped surface 114 opposite the microlenses 106 (i.e., a microlens surface 116). The angled surface 112, of the fiber array block 102, and the sloped surface 114, of the microlens array substrate 104, are designed to reduce reflection at the boundary between the block 102 and the substrate 104. Preferably, the microlens array substrate 104 is made of a glass (e.g., PYREX®) and one end of the fibers 108 are fixed flush with and have substantially the same angle as the angled surface 112.

The block 102 and the substrate 104 are preferably joined to each other through the use of a commercially available index-matched optical adhesive 110A, preferably using an active alignment tool. Suitable UV-cured index-matched optical adhesives are commercially available from NTT Advanced Technology Corporation (e.g., product number 9389 is suitable for a refractive index of 1.448). If desired, a conventional anti-reflection (AR) coating or coatings 110B may also be added to the interface between the block 102 and the substrate 104. The angles (i.e., the angled surface 112 and the sloped surface 114) are preferably eight degrees from perpendicular to the optical axes of the fibers 108, which, in theory, should provide at least a 60 dB attenuation of any reflected signal. Reflections can also be further reduced at the microlens surface 116 by applying an AR coating (or a multi-layer AR coating) 117 to the surface 116. However, utilizing an AR coating 117 with the microlens array substrate 104, of FIG. 1A, has been shown to only reduce reflections to about one-tenth of one percent of the transmitted signal (i.e., about 30 dB). While a return loss of 30 dB is acceptable in many applications, such a return loss is generally not acceptable in some practical applications, such as fiber amplifier modules.

Figure 1C:
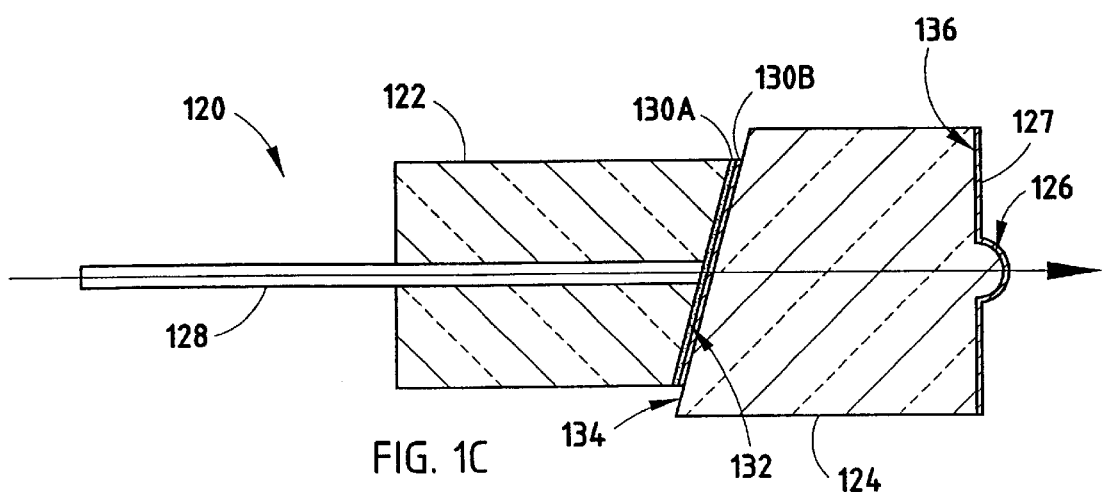
FIG. 1C is a cross-sectional view of an optical fiber collimator array, according to another embodiment of the present invention.

FIG. 1C illustrates a cross-sectional view of an optical fiber collimator array 120, according to another embodiment of the present invention, that retains a plurality of optical fibers 128 within an optical fiber array block 122. The fiber collimator array 120 can typically achieve a return loss greater than 60 dB when AR coatings are utilized. An aspheric microlens array substrate 124 includes a plurality of aspheric microlenses 126, which are spaced such that each microlens 126 receives an optical signal from one of the optical fibers 128. The fiber array block 122 includes an angled surface 132, opposite the end of the fiber block 122 in which the fibers 128 enter the block 122. The microlens array substrate 124 includes a sloped surface 134 opposite the microlenses 126 (i.e., a microlens surface 136). The angled surface 132 of the fiber array block 122 and the sloped surface 134 of the microlens array substrate 124 are designed to reduce reflection at the boundary between the block 122 and the substrate 124. Preferably, the microlens array substrate 124 is also made of a glass (e.g., PYREX®).

The block 122 and the substrate 124 are preferably attached to each other through the use of an index-matched optical adhesive 130A, preferably using an active alignment tool, and may included an AR coating (or coatings) 130B at the interface. Similar to the collimator array 100 of FIG. 1A, the angles of the block 122 and substrate 124 are preferably eight degrees from perpendicular to the optical axes of the fibers 128. Reflections can also be further reduced by applying an anti-reflection (AR) coating 127 to the microlens surface 136.

Figure 2:
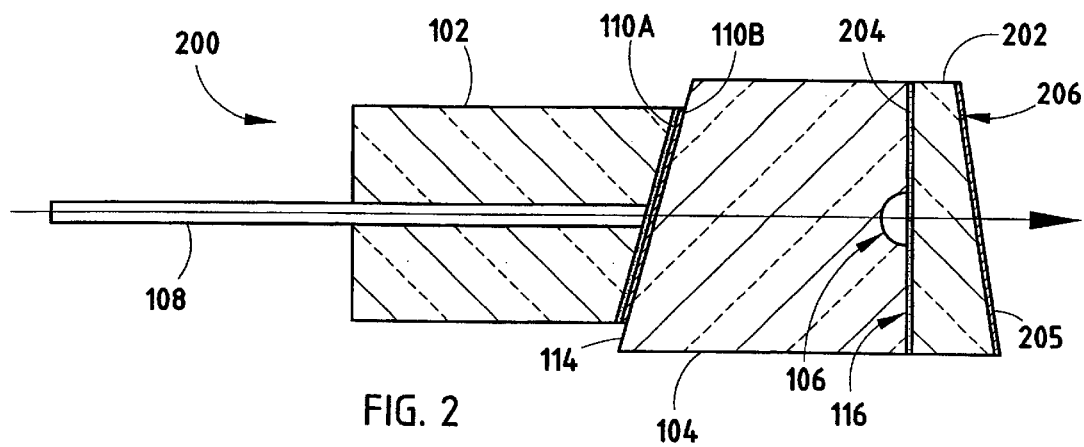
FIG. 2 is a cross-sectional view of the collimator array of FIG. 1A that additionally includes an index-matched angled spacer.

The reflections of the array 100 can be further reduced through the implementation of an index-matched angled spacer. As shown in FIG. 2, an optical fiber collimator array 200 includes an index-matched angled spacer 202, which reduces reflections at the microlens surface 116 of the GRIN microlens array substrate 104. Preferably, the angled spacer 202 is attached to the microlens surface 116, of the array substrate 104, with an index-matched optical adhesive 204, after active alignment of the microlens array 104 with the fiber array block 102. The refractive index of the spacer 202 is preferably selected to be substantially the same as that of the microlens 106. When another device, such as an optical filter, is not directly connected to the spacer 202, a slanted surface 206 of the spacer 202, opposite that attached to the microlens array substrate 104, is also preferably coated with an AR coating 205 to further reduce reflection. Typically, a slant of less than about one degree is enough for the spacer 202 to adequately attenuate any reflections (i.e., at least a 60 dB loss).

In the fiber collimator arrays 100, 120 and 200 of FIGS. 1A–1C and 2, respectively, the optical beam axis generally slightly slants at the boundary of the fiber array block and the microlens array substrate when the refractive index of the materials (i.e., the fiber core and substrate) differ from each other. As such, the coupling efficiency of an optical system, that includes such a collimator array, is slightly degraded. This is because the modefield center of optical power in the microlens plane slightly shifts from the center of the microlens. This slight shift adversely affects the coupling efficiency, since the whole optical beam modefield is very close to the effective microlens area.

Figure 3:
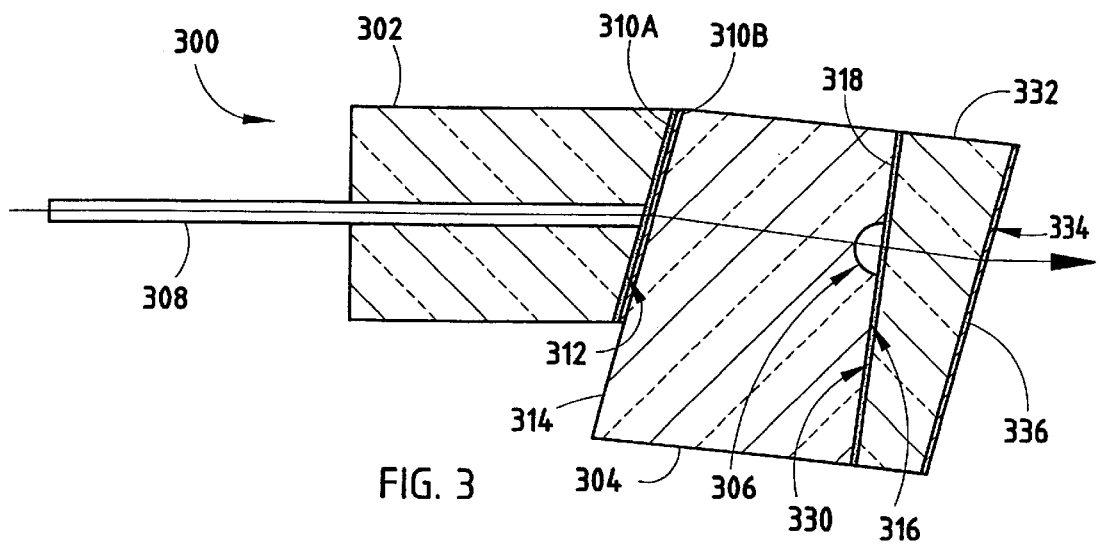
FIG. 3 is a cross-sectional view of another embodiment of an optical fiber collimator array of the present invention.

Moving to FIG. 3, a cross-sectional view of an optical fiber collimator array 300, according to yet another embodiment of the present invention, is depicted. In general, the fiber collimator array 300 provides a higher coupling efficiency as compared to the fiber collimator arrays of FIGS. 1A–1C and 2. As shown in FIG. 3, an optical fiber array block 302 retains a plurality of optical fibers 308. An angled surface 312 of the fiber array block 302 is coupled (preferably, with an index-matched optical adhesive 310A) to a sloped surface 314 of a GRIN microlens array substrate 304. If desired, an AR coating 310B may also be provided at the interface between the block 302 and the substrate 304. The sloped surface 314 of the microlens array substrate 304 is preferably formed at an angle that is different from the angled surface 312 of the fiber array block 302.

The center angle of the sloped surface 314 of the microlens array substrate 304 is, preferably, adjusted to be a somewhat different value from 8+/−0.5 degrees, depending on the difference of the refractive index of the core of fibers 308 and the microlens array substrate 304. If the refractive index of the microlens array substrate 304 is 1.66, for example, an appropriate center angle is about 83 degrees. The microlens array substrate 304 is adjusted in relation to the block 302 such that the optical beam axis coincides with the optical axis (i.e., center) of each of the microlenses 306. In this configuration, the reflection from the microlens surface 316 can be reduced by using an index-matched optical adhesive 318 and by attaching an index-matched angled spacer 332 that includes an AR coating 336 on its slanted surface 334. A back surface 330 of the spacer 332 does not require an AR coating, since the index of the spacer 332 preferably matches that of the microlens 306. A similar configuration can also be utilized in conjunction with an aspheric microlens array substrate, such as that of FIG. 1C.

A preferred material for the optical fiber array blocks of FIGS. 1A–1C, 2 and 3 is PYREX® or silicon glass, which is selected to match the coefficient of thermal expansion (CTE) of the microlens array substrate material. That is, if the microlens array substrate is made of silica glass, the same material (silica glass) would be a preferred choice for the material of the fiber array block.

Figure 4:
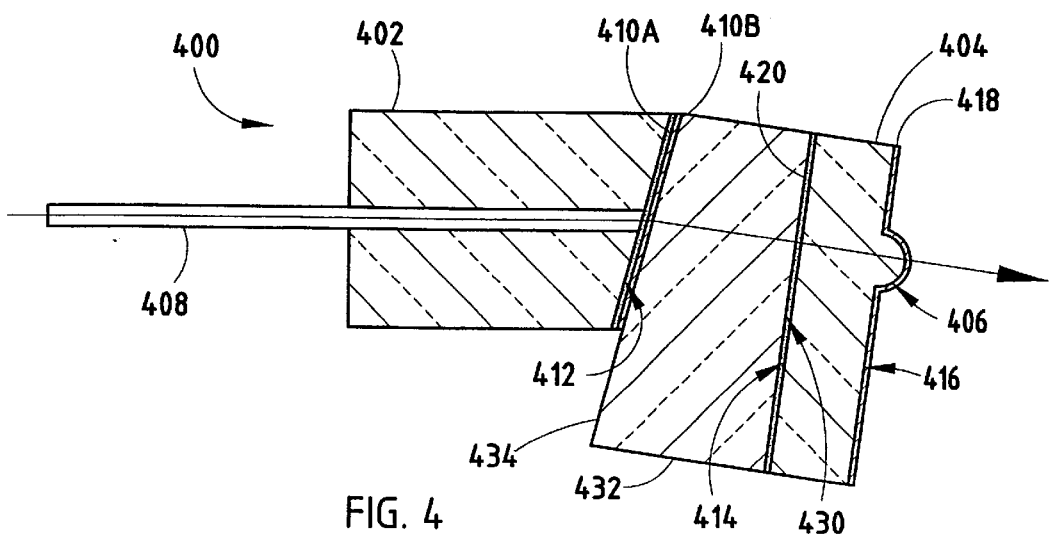
FIG. 4 is a cross-sectional view of yet another embodiment of an optical fiber collimator array of the present invention.

FIG. 4 depicts a cross-sectional view of an optical fiber collimator array 400, according to still another embodiment of the present invention. In general, the fiber collimator array 400 provides an alternative to the fiber collimator array 300 that is particularly useful when alignment of the block 302 and substrate 304 is burdensome or when the thickness of the substrate 304 cannot be easily controlled to within about ten microns. As shown in FIG. 4, a fiber array block 402 retains a plurality of optical fibers 408. An angled surface 412 of the fiber array block 402 is coupled (e.g., with an index-matched optical adhesive 410A) to a slanted surface 434 of an index-matched angled spacer 432. If desired, an AR coating 410B may also be provided at the interface between the block 402 and the spacer 432. The spacer 432 includes a back surface 430 that is opposite the slanted surface 434. The slanted surface 434 of the spacer 432 is preferably formed at an angle that is different from the angled surface 412, of the fiber array block 402. A back surface 414 of the microlens array substrate 404 is then adjusted in relation to the back surface 430, of the spacer 432, such that each optical beam axis coincides with an optical axis of one of the microlenses 406. When proper alignment is achieved between the substrate 404 and the spacer 432, the two are coupled together, preferably, with an index-matched optical adhesive 420. In this configuration, the reflection from the microlens surface 416, of the microlens array substrate 404, can be reduced by adding an AR coating 418 to the surface 416.

Figure 5:
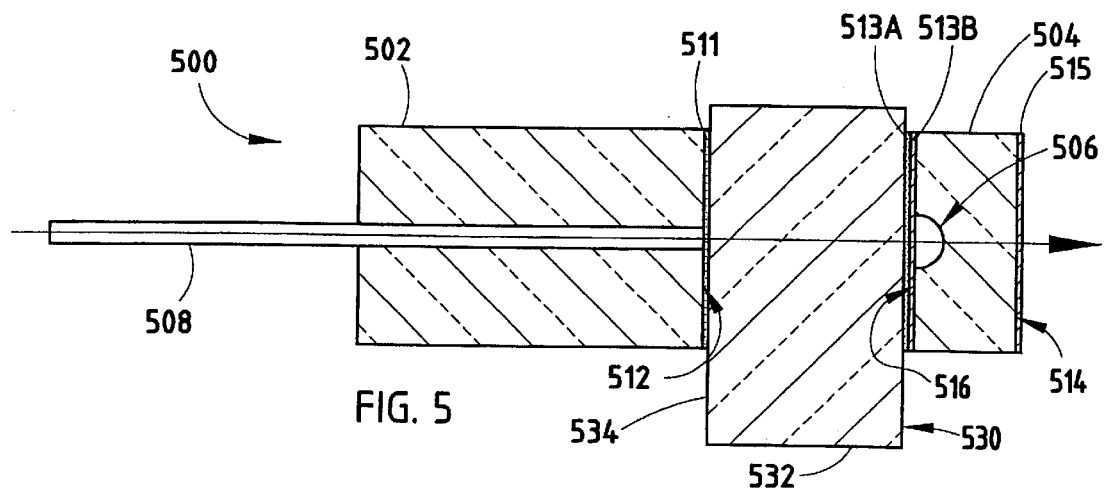
FIG. 5 is a cross-sectional view of still another embodiment of an optical fiber collimator array of the present invention.

FIG. 5 illustrates a cross-sectional view of an optical fiber collimator array 500, according to a different embodiment of the present invention. In the embodiment of FIG. 5, all surfaces of the array 500, that an optical beam crosses, are substantially perpendicular, at least initially, to the optical axis of each microlens 506. A fiber array block 502 retains a plurality of optical fibers 508 and includes a first surface 512 that is coupled (e.g., with an index-matched optical adhesive 511) to a first surface 534 of an index-matched spacer 532. The spacer 532 includes a second surface 530 that is opposite the first surface 534. A microlens surface 516 of the microlens array substrate 504 is then adjusted in relation to the second surface 530 such that the optical beams coincide with the optical axis of each of the microlenses 506.

When proper alignment is achieved between the substrate 504 and the spacer 532, they are coupled together, preferably, with an index-matched optical adhesive 513A. If desired, an AR coating 513B may also be provided at the interface between the spacer 532 and the substrate 504. The refractive index of the spacer 532 is preferably matched to the refractive index of the core of the optical fiber 508. A reflection reduction of approximately 20 dB is achievable due to the spacing, dictated by the width (dependent on the focal length of the microlenses 506) of the spacer 532, between the ends of the optical fibers 508 and the microlenses 506. This is because the modefield of an optical beam from each of the fibers 508 diverge until they reach one of the microlenses 506. In this configuration, the reflection from the microlens surface 516 of the microlens array substrate 504 can be reduced by adding an AR coating 513B to the interface between the spacer 532 and the substrate 504. Further, the reflection from a back surface 514 of the array 504, opposite the microlens surface 516, can be reduced by adding an AR coating 515 to the surface 514 and further reduced by angle polishing the surface 514.

Figure 6:
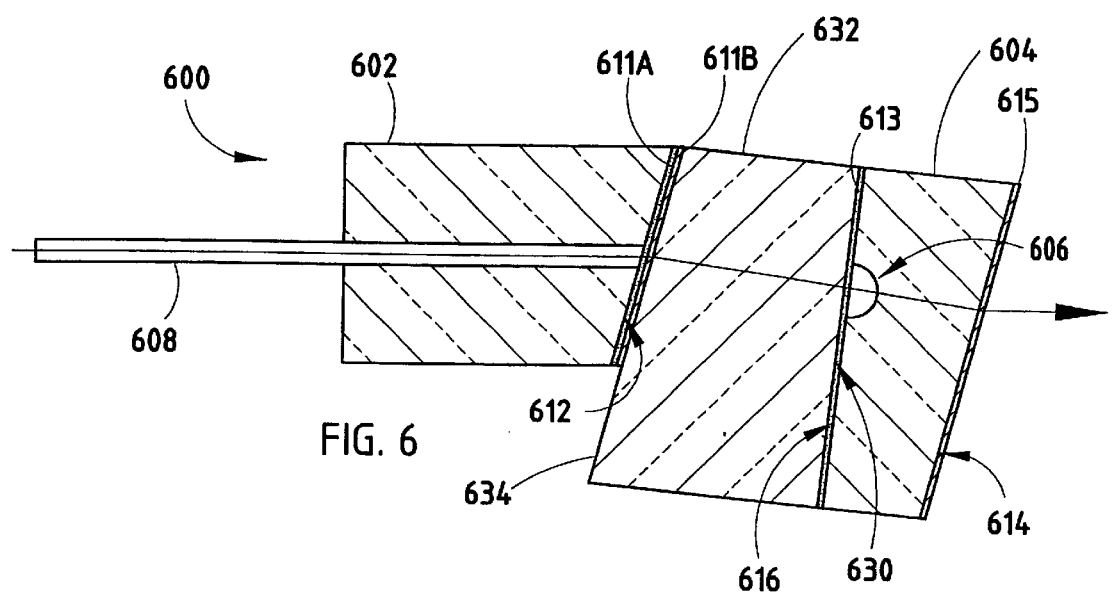
FIG. 6 is a cross-sectional view of a different embodiment of an optical fiber collimator array of the present invention.

FIG. 6 illustrates a cross-sectional view of an optical fiber collimator array 600, according to another embodiment of the present invention. An optical fiber array block 602 retains a plurality of optical fibers 608 and includes an angled surface 612 that is coupled (e.g., with an index-matched optical adhesive 611A) to a slanted surface 634 of an index-matched spacer 632. If desired, an AR coating 611B may also be provided at the interface between the spacer 632 and the block 602. The spacer 632 includes a back surface 630, opposite the angled surface 634, that is generally perpendicular to the optical axes of microlens 606. A microlens surface 616, of the microlens array substrate 604, is then adjusted in relation to the surface 630, of the spacer 632, such that the optical beams coincide with the optical beam axis of each of the microlenses 606.

When proper alignment is achieved between the substrate 604 and the spacer 632, they are coupled together, preferably, with an index-matched optical adhesive 613. The refractive index of the spacer 632 is, preferably, matched to the refractive index of the microlens 606. Further, any reflection from the surface 614 of the array 604, opposite the microlens surface 616, can generally be reduced by angle polishing the surface 614 and normally further reduced by adding an AR coating 615 to the surface 614.

Figure 7A:
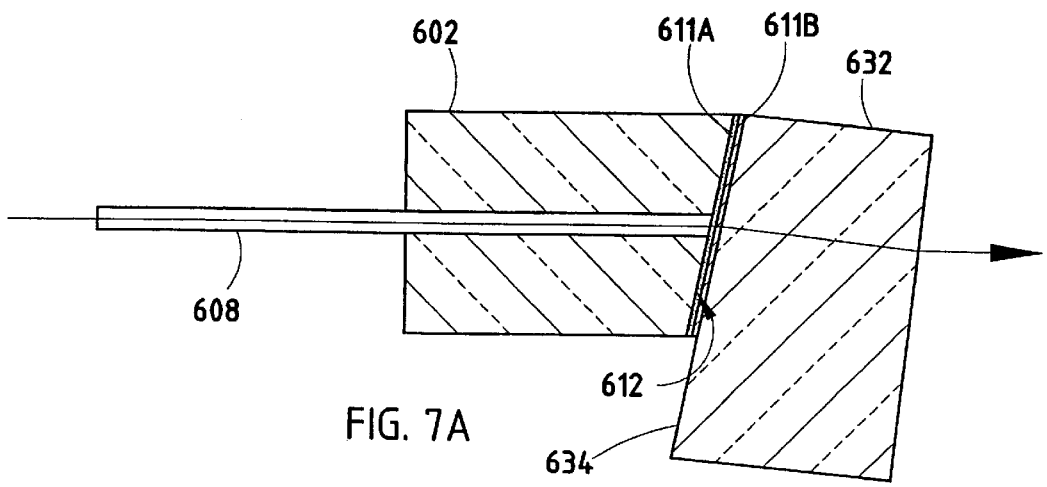
FIGS. 7A–7C are cross-sectional views of the optical fiber collimator array of FIG. 6 during assembly.
Figure 7B:
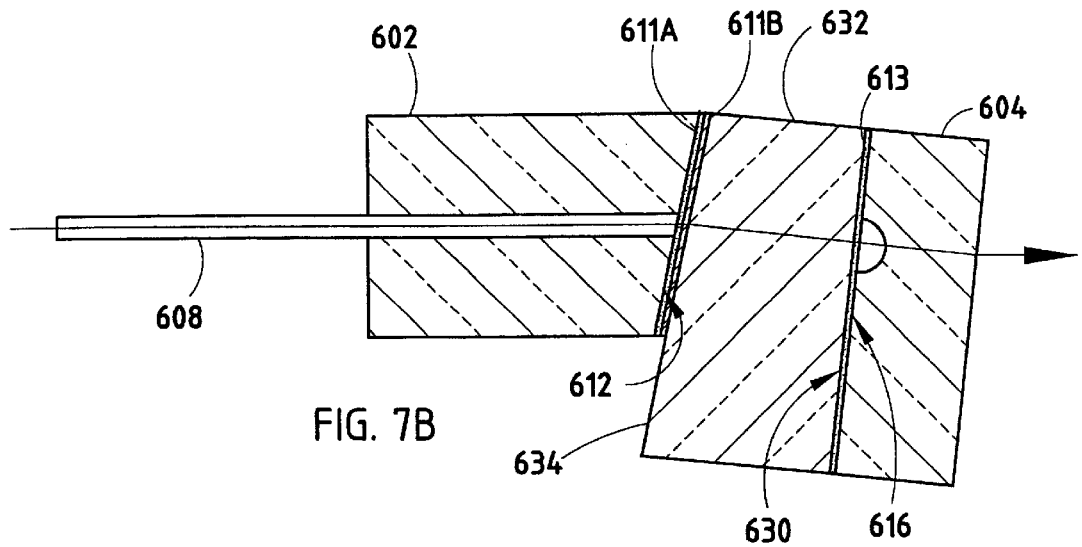
Figure 7C:
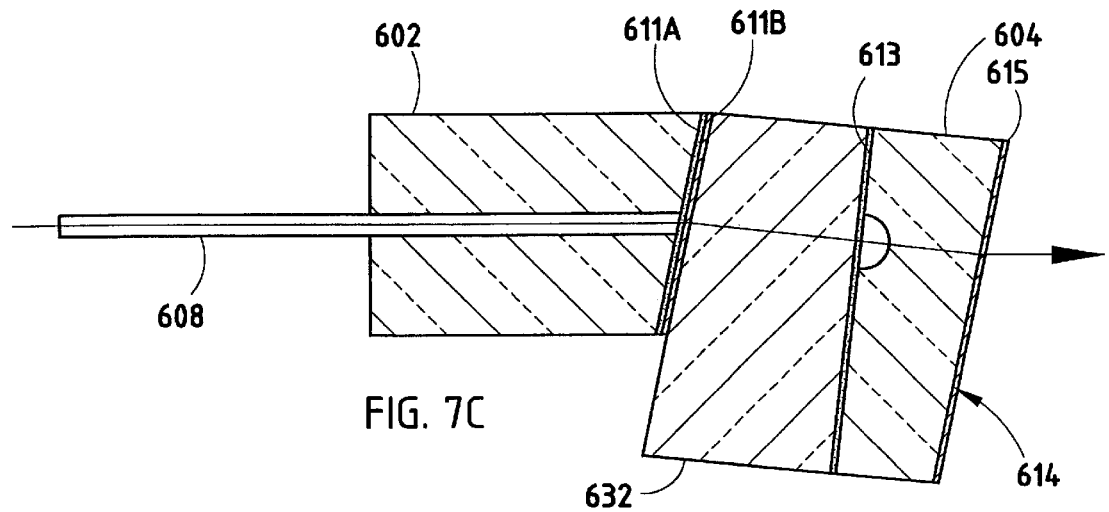

FIGS. 7A–7C illustrate a simplified procedure for fabricating the fiber collimator array 600 of FIG. 6. As shown in FIG. 7A, initially, the slanted surface 634 of the index-matched spacer 632 is attached to the angled surface 612 of the optical fiber array block 602. The effective thickness (i.e., the length of the optical path in the spacer 632) is passively adjusted using an alignment tool. Next, as is shown in FIG. 7B, the microlens surface 616 of the microlens array substrate 604 is actively aligned, preferably by using a mirror, with the back surface 630 of the spacer 632. When proper alignment is achieved, the spacer 632 and microlens array substrate 604 are fixed in relation to one another with an index-matched optical adhesive 613. Finally, as shown in FIG. 7C, the back surface 614 of the substrate 604 is angle polished and AR coated 615, if required for the application.

Figure 8:
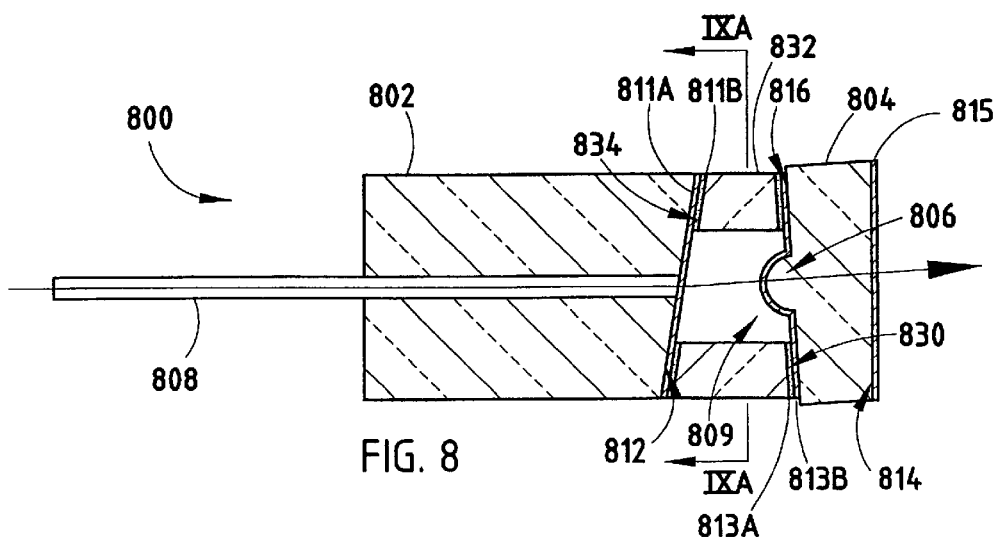
FIG. 8 is a cross-sectional view of an optical fiber collimator array that utilizes a spacer with a hole.

FIG. 8 depicts a cross-sectional view of a fiber collimator array 800, according to yet another embodiment of the present invention. A fiber array block 802 retains a plurality of optical fibers 808 and includes an angled surface 812. A slanted surface 834 of a spacer 832 is adjusted with respect to the angled surface 812 until the optical beams provided through the optical fibers 808 are perpendicular to a back surface 830 of the spacer 832. The block 802 and the spacer 832 are then fixed with an adhesive 811B. If desired, an AR coating 811A may also be utilized on the surface 812 of the block 802 to reduce reflections. A microlens surface 816 of the microlens array substrate 804 is then adjusted in relation to the surface 830 of the spacer 832 such that the optical beams coincide with the optical beam axis of each of the microlenses 806. Preferably, the spacer 832 has a hole 809, which allows the optical beams to pass from the ends of the optical fibers 808, through air, to the microlens 806.

When proper alignment is achieved between the substrate 804 and the spacer 832, they are coupled together, with an adhesive 813A. However, in this embodiment an index-matched optical adhesive is not required since the optical beams travel through air. In this configuration, any reflection from the microlens surface 816, of the microlens array 804, can also typically be reduced by adding an AR coating 813B to the surface 816. Reflections from the surface 814, opposite the microlens surface 816, can also typically be reduced by angle polishing the surface 814 and by adding an AR coating 815 to the surface 814, if required for the application.

When a spacer is located between the fiber array block and the microlens array substrate, as shown in FIGS. 4, 5, 6, 7A–7C and 8, it is desirable to CTE match the spacer with the fiber array block and the microlens array substrate for high property stability over a wide temperature range. Preferably, the spacer material is a glass material that is transparent in the applied wavelength range, except in the case of FIG. 8, the spacer material does not have to be transparent in the applied wavelength range. The glass material of the angled spacer of FIG. 4 is, preferably, selected to match the refractive index of the microlens array substrate. The glass material of the angled spacer of FIGS. 2, 3, 6 and 7A–7C is, preferably, selected to match the refractive index of the microlenses.

A suitable angle for the angled surface of the fiber array blocks of FIGS. 1A–1C, 2, 3, 4, 6, 7A–7C and 8 is about 8+/−0.1 degrees. It should be appreciated that the angle range is a function of the desired minimum reflection. For example, if a center angle of 8.5 degrees is utilized, a wider angular range of about +/−0.6 degrees provides an acceptable reflection reduction. An acceptable angle for the sloped surface of the microlens array substrate is about 8+/−0.5 degrees. However, the angle of the sloped surface can typically vary somewhat as the position of the microlens array substrate to the fiber array block is adjusted actively in the fiber collimator array fabrication process. In the case of the array of FIG. 3, the center angle of the sloped surface is preferably adjusted to be a slightly different value from 8+/−0.5 degrees, depending on the refractive index difference between the core of the fiber and the microlens array substrate. A similar angular range of +/−0.5 degrees from the center angle is also usually acceptable for the slanted surface of the angled spacers of FIGS. 4, 6, 7A–7C and 8. In the case of FIGS. 6, 7A–C and 8, the back surface of the microlens array substrate is, preferably, angle polished to an angle of 1+/−0.5 degrees, since a minimum angle of 0.4 degrees reduces the reflectivity such that the collimator array attenuates reflections by at least about 60 dB. The back surface of the index-matched angled spacers of FIGS. 2 and 3 are also preferably angle polished to an angle of about 1+/−0.5 degrees for similar reasons.

Figure 9A:
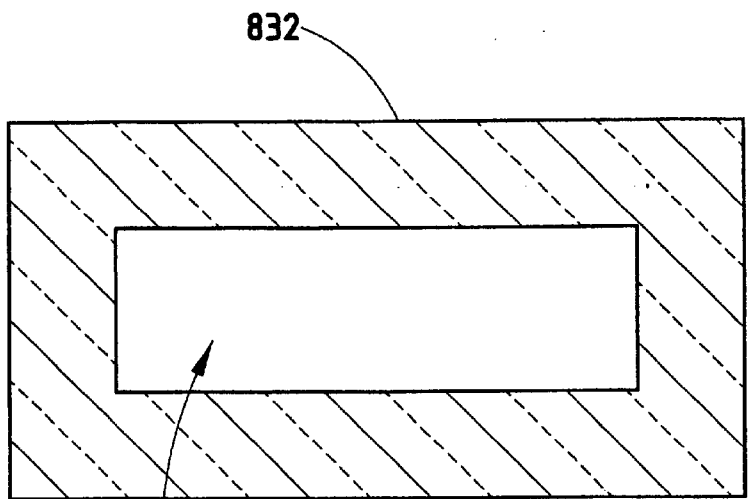
FIGS. 9A–9B are cross-sectional, taken through sectional line IXA, and end elevational views, respectively, of the spacer of FIG. 8.
Figure 9B:
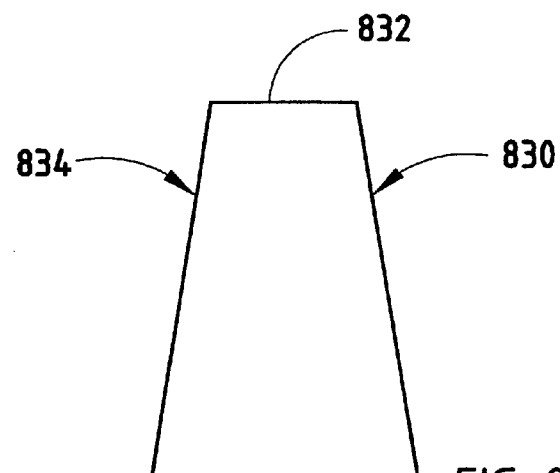
Figure 10:
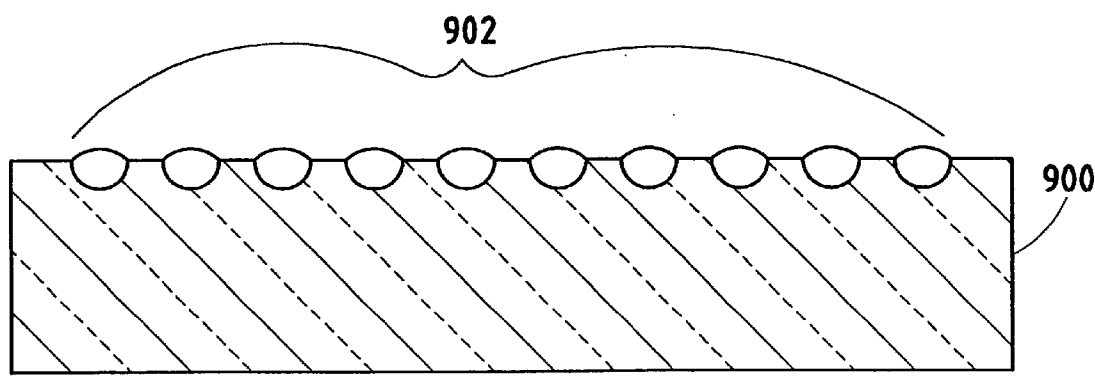
FIG. 10 is a cross-sectional view of a microlens array substrate with a non-flat lens surface.

FIGS. 9A–9B show a cross-sectional view and a side view, respectively, of an exemplary spacer 832 that can be utilized in the array of FIG. 8. As previously discussed, with respect to FIG. 8, the slanted surface 834 is adjusted such that the back surface 830, which faces the substrate, is perpendicular to the optical beams provided by the optical fibers 808. FIG. 10 depicts a microlens array 900 with a non-flat lens surface 902 that can be utilized with many of the embodiments, disclosed herein. Further, while only linear arrays have been depicted, one of ordinary skill in the art will appreciate that the arrays, disclosed herein, can readily be expanded to two-dimensional arrays.

In summary, an optical fiber collimator array has been described that includes an optical fiber array block and a microlens array substrate. The optical fiber array block includes an angled surface and is configured to receive and retain a plurality of individual optical fibers, which carry optical signals. The microlens array substrate includes a plurality of microlenses integrated along a microlens surface and a sloped surface opposite the microlens surface. The microlens surface is coupled to the angled surface such that the optical signals from the individual optical fibers are each collimated by a different one of the integrated microlenses. According to another embodiment of the present invention, an optical fiber collimator array includes an optical fiber array block, a microlens array substrate and an index-matched spacer. The optical fiber array block is configured to receive and retain a plurality of individual optical fibers, which carry optical signals. The microlens array substrate includes a plurality of microlenses integrated along a microlens surface and the index-matched spacer couples the optical fiber array block to the microlens array substrate.

It will become apparent to those skilled in the art that various modifications to the preferred embodiment of the invention as described herein can be made without departing from the spirit or scope of the invention as defined by the appended claims.

The invention claimed is:

1. An optical fiber collimator array, comprising:
an optical fiber array block configured to receive and retain a plurality of individual optical fibers which carry optical signals, the optical fiber array block including an angled surface;
a microlens array substrate including a plurality of microlenses integrated along a microlens surface, the microlens array substrate including a sloped surface opposite the microlens surface that is coupled to the angled surface such that the optical signals from the individual optical fibers are each collimated by a different one of the integrated microlenses; and an index-matched angled spacer including a slanted surface and a perpendicular surface opposite the slanted surface, wherein the perpendicular surface is coupled to the microlens surface and the angle of the slanted surface is different from that of the sloped surface of the microlens array substrate and the angled surface of the optical fiber array block.

2. The collimator array of claim 1, wherein the integrated microlenses are graded-index (GRIN) lenses.

3. The collimator array of claim 1, wherein the integrated microlenses are aspheric lenses.

4. The collimator array of claim 1, wherein the integrated microlenses are Fresnel lenses.

5. The collimator array of claim 1, wherein the sloped surface of the microlens array substrate is coupled to the angled surface of the optical fiber array block by an index-matched optical adhesive.

6. The collimator array of claim 1, wherein the microlens surface includes an anti-reflection (AR) coating.

7. The collimator array of claim 1, wherein the pitch of the integrated microlenses is about 250 microns.

8. The collimator array of claim 1, wherein the sloped surface of the microlens array substrate and the angled surface of the optical fiber array block are both at about eight degrees from perpendicular to the optical axes of the individual optical fibers.

9. The collimator array of claim 1, wherein the sloped surface of the microlens array substrate and the angled surface of the optical fiber array block are both at about eight degrees from perpendicular to the optical axes of the individual optical fibers and the slanted surface of the index-matched angled spacer is less than one degree from perpendicular to the optical axes of the microlenses.

10. The collimator array of claim 1, wherein the slanted surface of the index-matched angled spacer includes an anti-reflection (AR) coating.

11. The collimator array of claim 1, wherein the sloped surface of the microlens array substrate and the angled surface of the optical fiber array block are at different angles with respect to the optical axes of the individual optical fibers.

12. A method for fabricating a fiber collimator array, comprising the steps of:

providing an optical fiber array block configured to receive and retain a plurality of individual optical fibers which carry optical signals, the optical fiber array block including an angled surface;

providing an index-matched spacer coupling the optical fiber array block to the microlens array substrate, the index-matched spacer including a slanted surface and a back surface opposite the slanted surface;

adjusting the slanted surface of the index-matched spacer in relation to the angled surface of the optical fiber array block to provide a desired optical path length through the spacer;

attaching the slanted surface of the index-matched spacer to the angled surface of the optical fiber array block using an index-matched optical adhesive when the desired optical path length through the spacer is achieved;

providing a microlens array substrate including a plurality of microlenses integrated along a microlens surface; adjusting the microlens array substrate in relation to the back surface of the spacer to provide maximum optical power through the microlenses; and attaching the microlens surface of the microlens array substrate to the back surface of the spacer using an index-matched optical adhesive when maximum optical power is provided through the microlenes.

13. The method of claim 12, further including the step of:

polishing a back surface of the microlens array substrate at an angle to reduce reflections, wherein the back surface is the surface opposite the microlens surface.

14. The method of claim 13, further including the step of:

applying an anti-reflection (AR) coating to the back surface of the microlens array substrate to further reduce reflections.

15. A method for fabricating an optical fiber collimator array, comprising the steps of:

providing an optical fiber array block configured to receive and retain a plurality of individual optical fibers which carry optical signals, the optical fiber array block including an angled surface;

providing a microlens array substrate including a plurality of microlenses integrated along a microlens surface, the microlens array substrate including a sloped surface opposite the microlens surface that is coupled to the angled surface such that the optical signals from the individual optical fibers are each collimated by a different one of the integrated microlenses; and providing an index-matched angled spacer including a slanted surface and a back surface opposite the slanted surface, wherein the back surface is coupled to the microlens surface and the angle of the slanted surface is different from that of the sloped surface of the microlens array substrate and the angled surface of the optical fiber array block.

16. The method of claim 15, wherein the integrated microlenses are graded-index (GRIN) lenses.

17. The method of claim 15, wherein the integrated microlenses are aspheric lenses.

18. The method of claim 15, wherein the sloped surface of the microlens array substrate is coupled to the angled surface of the optical fiber array block by an index-matched optical adhesive.

19. The method of claim 15, wherein the microlens surface includes an anti-reflection (AR) coating.

20. The method of claim 15, wherein the pitch of the integrated microlenses is about 250 microns.

21. The method of claim 15, wherein the sloped surface of the microlens array substrate and the angled surface of the optical fiber array block are both at about eight degrees from perpendicular to the optical axes of the individual optical fibers.

22. The method of claim 15, wherein the sloped surface of the microlens array substrate and the angled surface of the optical fiber array block are both at about eight degrees from perpendicular to the optical axes of the individual optical fibers and the slanted surface of the index-matched angled spacer is less than one degree from perpendicular to the optical axes the microlenses.

23. The method of claim 15, wherein the slanted surface of the index-matched angled spacer includes an anti-reflection (AR) coating.

24. The method of claim 15, wherein the sloped surface of the microlens array substrate and the angled surface of the optical fiber array block are at different angles with respect to the optical axes of the individual optical fibers.

* * * * *